US006760846B1

(12) United States Patent
Yoshida et al.

(10) Patent No.: US 6,760,846 B1
(45) Date of Patent: Jul. 6, 2004

(54) SYSTEM FOR DETERMINING AND SUPPLYING STABILIZED VOLTAGE FROM A POWER SUPPLY TO A DATA PROCESSOR AFTER A FLUCTUATING PERIOD

(75) Inventors: Ichiro Yoshida, Takahama (JP); Yasuyuki Ito, Ichinomiya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 09/545,671

(22) Filed: Apr. 7, 2000

(30) Foreign Application Priority Data

Apr. 8, 1999 (JP) .......................................... 11-101526

(51) Int. Cl.[7] .................................................. G06F 1/30
(52) U.S. Cl. ..................................... 713/300; 713/340
(58) Field of Search ................................. 713/300, 320, 713/323, 340; 327/143, 365; 323/282; 711/163, 167

(56) References Cited

U.S. PATENT DOCUMENTS

| 4,205,376 | A |   | 5/1980 | Yoshida |         |
|-----------|---|---|--------|---------|---------|
| 4,580,222 | A |   | 4/1986 | Fujii   |         |
| 5,714,898 | A | * | 2/1998 | Kim     | 327/143 |
| 5,903,139 | A | * | 5/1999 | Kompelien | 323/282 |
| 6,060,942 | A | * | 5/2000 | Oh      | 327/536 |

FOREIGN PATENT DOCUMENTS

| JP | 55-146241 | 11/1980 |
| JP | 57-152025 | 9/1982 |
| JP | 58-155243 | 9/1983 |
| JP | 58-164022 | 11/1983 |
| JP | 59-28048  | 2/1984  |

(List continued on next page.)

OTHER PUBLICATIONS

Office Action dated Nov. 5, 2002 from corresponding Japanese Application No. 11-101526 (with English translation).

(List continued on next page.)

*Primary Examiner*—Thomas Lee
*Assistant Examiner*—Thuan Du
(74) *Attorney, Agent, or Firm*—Harness, Dickey & Pierce, PLC

(57) ABSTRACT

A data processor, which is capable of preventing from causing a harmful influence due to an operation of the other loads, even when the data processor is powered by a battery, which is commonly used by the other loads. A vehicle-mounted personal computer as the data processor is powered by a vehicle-mounted battery via a main power supply circuit. When a key switch is turned on, a start-up circuit in the main power supply circuit outputs a start-up signal after a predetermined time has passed, so that output voltage from the vehicle-mounted battery is stable. After that, the main power supply circuit supplies power to the personal computer. As a result, the personal computer starts up by using a stable voltage. When the key switch is turned off, the personal computer moves to a sleep mode. When the key switch is turned on again, the personal computer returns to a previous condition by performing a resume process. As a result, it is not necessary to read and start up an Operation System every time the key is turned on. When the main power supply circuit detects a falling of the output voltage from the vehicle-mounted battery, the main power supply circuit stops supplying the power after shutting down the personal computer.

22 Claims, 11 Drawing Sheets

FOREIGN PATENT DOCUMENTS

| | | |
|---|---|---|
| JP | 59-134828 | 9/1984 |
| JP | 59-169301 | 9/1984 |
| JP | 59-226918 | 12/1984 |
| JP | 60-21562 | 2/1985 |
| JP | 61-79869 | 5/1986 |
| JP | 62-152946 | 7/1987 |
| JP | 63-155213 | 6/1988 |
| JP | 3-28914 | 2/1991 |
| JP | 4-135937 | 5/1992 |
| JP | 4-248608 | 9/1992 |
| JP | 5-74038 | 3/1993 |
| JP | 7-219683 | 8/1995 |

OTHER PUBLICATIONS

Office Action dated Jun. 28, 2002 from corresponding Japanese Application No. 11–101526 (with English translation).

Henderson, "An Audit of Handling Shocks on Hard Disk Drives", Sound and Vibration/Mar. 1998, pp 22–27.

Grachowski et al., "Future Trends in Hard Disk Drives", EEE Transactions on Magnetics, vol. 32, No. 1, May 1996, pp 1850–1855.

* cited by examiner

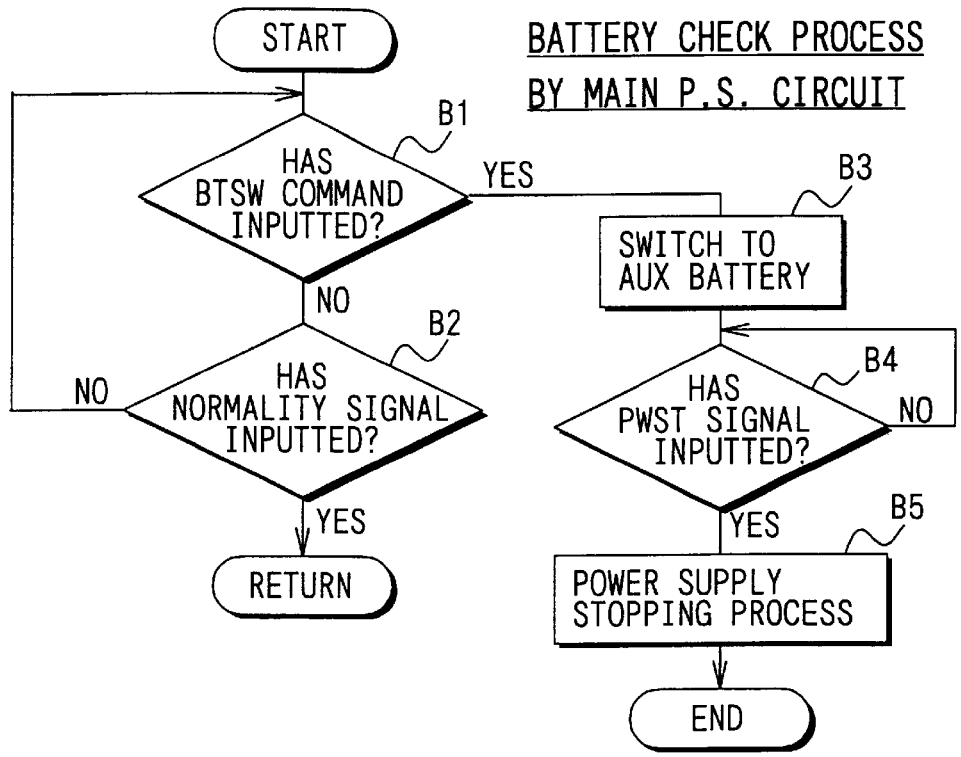
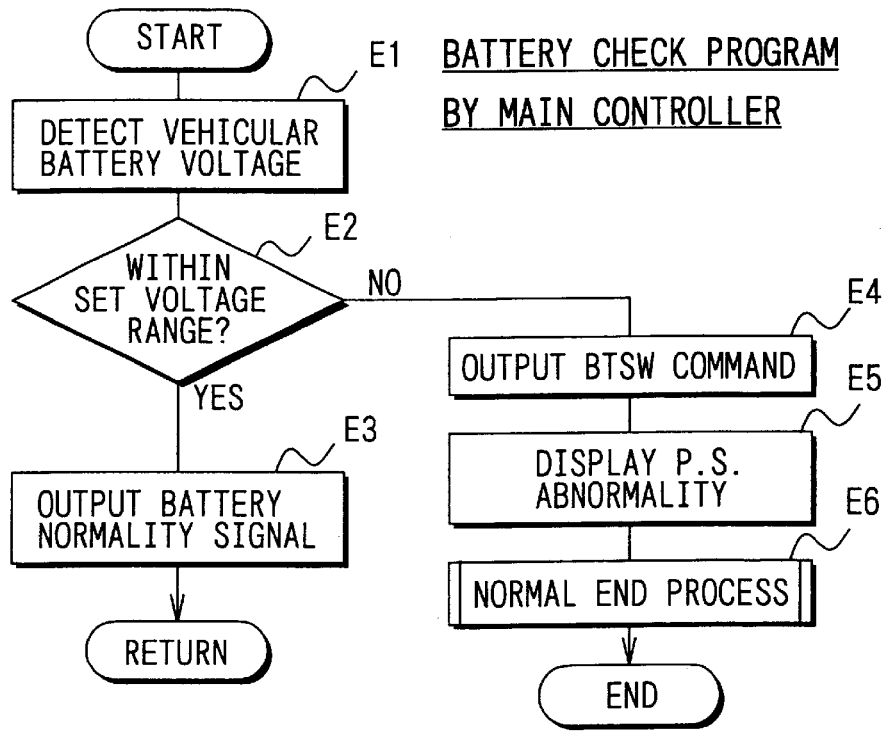

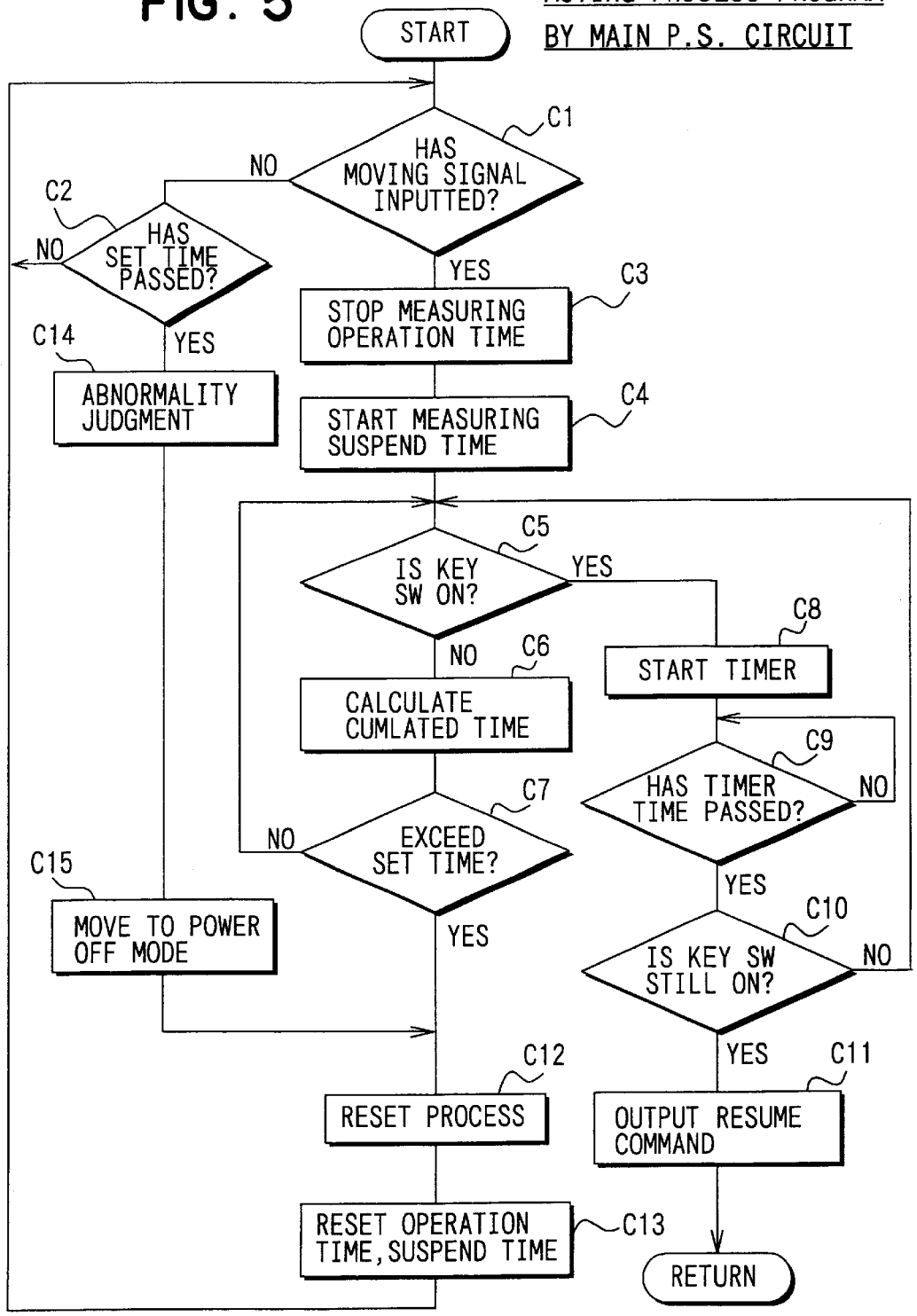

CONTROL PROGRAM BY MAIN CONTROLLER

NORMAL END PROCESS BY MAIN CONTROLLER

SLEEP-SUSPEND PROCESS BY MAIN CONTROLLER

RESUME DETECTION UNDER SLEEP CONDITION

RESUME PROCESS BY MAIN CONTROLLER

SYSTEM FOR DETERMINING AND SUPPLYING STABILIZED VOLTAGE FROM A POWER SUPPLY TO A DATA PROCESSOR AFTER A FLUCTUATING PERIOD

CROSS REFERENCE TO RELATED APPLICATION

This application is based upon Japanese Patent Application No. Hei. 11-101526 filed on Apr. 8, 1999, the contents of which are incorporated herein by reference.

BACKGROUND OF THE INVENTION

1. Field of the Invention

This invention relates to data processors and power supply apparatuses for the same, and particular to a data processor which accesses to memory means to write or to read data, and a power supply apparatus for the data processor which is powered by a power supply which supplies power to the data processor and the other loads 2. Related Art Recently, various types of data processors such as personal computers have been developed so as to deal large amount of data and to realize high process performance. These kinds of data processors can be operated by built-in battery without commercial power supply. In this case, since operation time is restricted by the battery, it is difficult to operate long time and therefore it needs to interrupt the operation for exchanging the battery or charging the battery. However, in a case where such the data processor is used in a particular place, which has a battery having an electric generator, such as vehicle, the operation time can be prolonged by supplying power to the data processor from a vehicle-mounted battery.

Particularly, when the personal computer is used in the vehicle for professional purpose, it is necessary to use the vehicle-mounted battery. However, in this case, when the vehicle-mounted battery is used to start up an engine or a drive motor, a terminal voltage of the vehicle-mounted battery may temporally fall due to large electric current flowing therein. Furthermore, in this case, a start-up time of the personal computer may be prolonged.

In detail, generally, in such the data processor to be mounted in the vehicle, many data including operation system (OS) as basic software, device driver software for controlling peripheral devices to be connected to the data processor, and plural application software (program), are installed in the data processor. As the operation system, there are basically two types. One is a general purpose OS for being installed in the data processor; and another is special purpose for being installed in the peripheral device. Here, it is preferable to apply the general purpose OS, from a viewpoint of extensibility so that the data processor may connect various types of peripheral devices.

However, in general, total file size of such the general purpose OS is large. Therefore it needs to use large capacity hard disk unit (HDD unit) to store such the general purpose OS, and it takes certain time to load the OS from the HDD unit. In this case, when the power supply voltage falls during accessing the HDD unit, the HDD unit may be damaged.

The above-described technical problems are summarized as follows.

First, in the case where the power is supplied to the data processor even during the engine's start-up, the data processor may not be able to complete the start-up when the engine cannot start up, because the power supply from the vehicle-mounted battery is stopped. Furthermore, when the power supply is interrupted as a result of exchanging the vehicle-mounted battery while the data processor operates, the HDD unit may be also damaged.

Second, when the data processor is mounted on a commercial vehicle as a vehicular terminal apparatus for, for example, the commercial vehicle, the total file size of the software to administrate process may become large. In the case where such the large software is used, when a system in which the vehicular terminal apparatus is started up every time the engine starts up is used, a total start-up time may be prolonged. Furthermore, it needs to provide means for performing a stop-reset (reset by turning off) by hardware to the vehicular terminal for preparing for undesirable defect of the HDD unit.

Third, in the case where the data processor is started up simultaneously with the engine's start-up, the data processor is turned off simultaneously with the engine's stop. However, in this case, when the data processor accesses to the HDD unit when the engine is stopped, the HDD unit may be damaged.

Fourth, in the case where the data processor can be operated even when the engine stops, the vehicle-mounted battery is used without being changed. Therefore, consumption of the vehicle-mounted battery may be facilitated, and the start-up of the engine may be harmfully influenced as a result.

SUMMARY OF THE INVENTION

This invention has been conceived in view of the background thus far described and its first object is to provide a data processor or a power supply apparatus for a data processor capable of preventing from causing a harmful influence due to an operation of the other loads, even when the data processor or the power supply apparatus for the data processor is powered by a battery, which is commonly used by the other loads.

Its second object is to provide a data processor or a power supply apparatus for a data processor capable of preventing an inconvenience in connection with a long start-up time.

According to the present invention, when the other loads, which is powered by a main power supply, is started up, the start-up circuit detects a stable condition of an output voltage from the main power supply. When the start-up circuit detects the stable condition of the output voltage from the main power supply, a power supply controller starts supplying the power from the main power supply to the data processor. In this case, even if power is supplied to the data processor while the other loads is being started up, the data processor can be started up from the stable condition after a unstable condition due to the start-up of the anther load. As a result, it can prevent from causing a harmful influence due to an operation of the other loads.

According to another aspect of the invention, the power supply controller measures a power supply time to the data processor, and restarts the data processor when the power supply time exceeds a predetermined time. As a result, it can prevent an inconvenience in connection with a long start-up time.

BRIEF DESCRIPTION OF THE DRAWINGS

These and another objects, features and characteristics of the present invention will be appreciated from a study of the following detailed description, the appended claims, and drawings, all of which form parts of this application. In the drawings, same portions or corresponding portions are put the same numerals each other to eliminate redundant explanation. In the drawings:

FIG. 4 is a flowchart illustrating a battery check process executed by the main power supply circuit;

FIG. 5 is a flowchart illustrating a moving process executed by the main power supply circuit;

FIG. 7 is a flowchart illustrating a battery check process executed by the main controller;

DESCRIPTION OF THE PREFERRED EMBODIMENTS

First Embodiment

Here, a first embodiment in which the present invention is applied to a personal computer for being mounted on a vehicle will be explained with reference to FIGS. 1 through 12.

Figure 1:
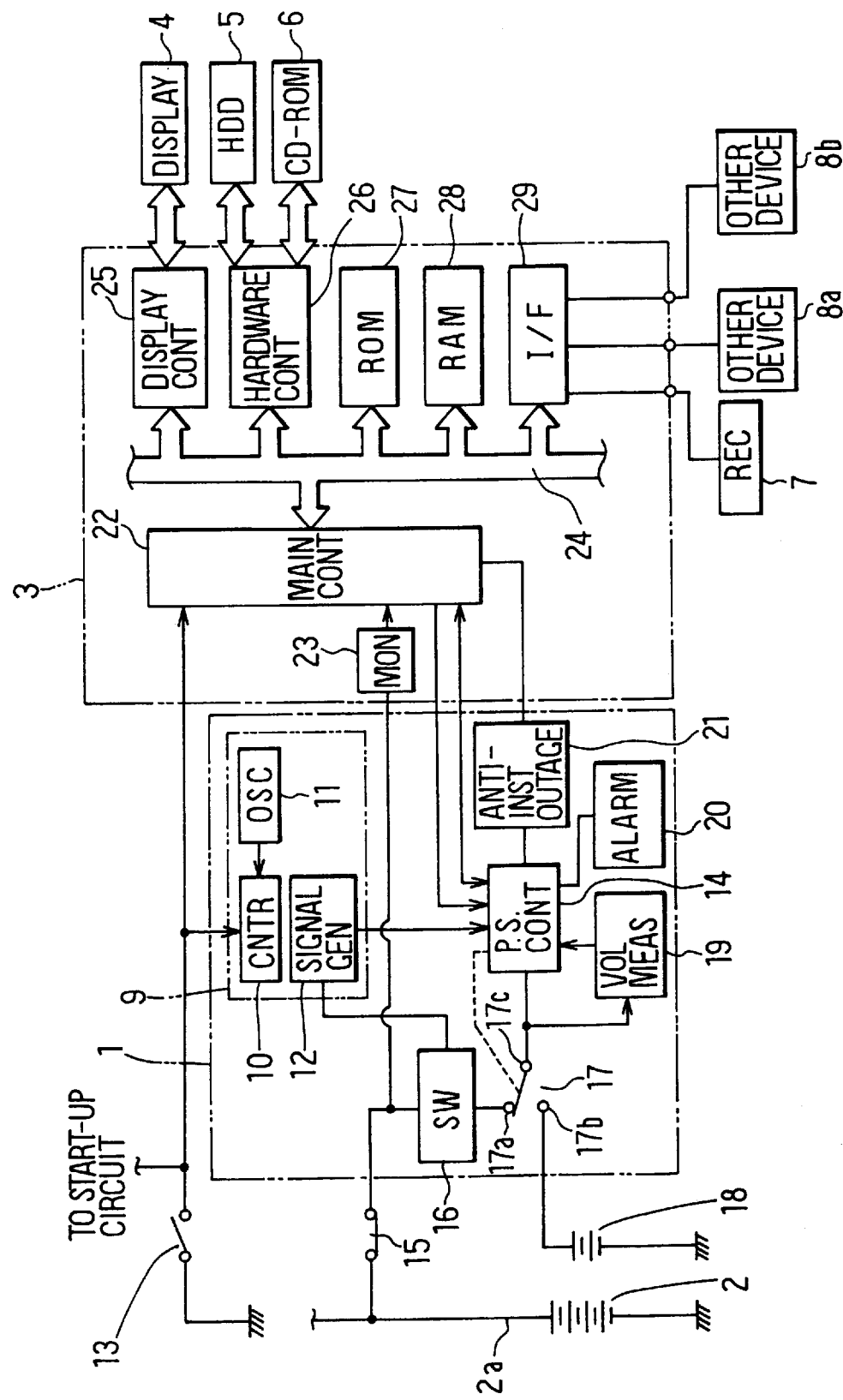
FIG. 1 is a schematic block diagram illustrating an entire construction of a data processor of a first embodiment according to the present inventions.

FIG. 1 schematically shows an entire electrical component (block diagram) of this embodiment. A main power supply circuit 1 as a power supply for a data processor is provided between a vehicle-mounted battery 2 as an operation battery and a vehicle-mounted personal computer 3, and controls power supply to the vehicle-mounted personal computer 3. A display 4, a hard disk unit (HDD unit) 5, and CD-ROM unit 6 as external devices are connected to the vehicle-mounted personal computer 3. Furthermore, a vehicle speed recorder 7 for recording speeds of the vehicle, and other vehicle-mounted devices 8a and 8b for communicating data with the vehicle-mounted personal computer 3 are connected.

Hereinafter, a construction of this system will be explained in detail. In the main power supply circuit 1, a start-up circuit 9 as start-up means is made up of a counter 10, an oscillator 11, and a signal generating circuit 12. The counter 10 inputs a condition signal of a key switch 13 for start-up an engine (internal combustion engine) or a driving motor (electric vehicle). When the key switch 13 is turned on, the counter 10 starts to count-up operation using clock pulses from the oscillator 11. The signal generation circuit 12 outputs a start-up signal when a counter value as a counted time inputted from the counter 10 reaches a predetermined value.

A power supply controller 14 as power supply controlling means is mainly made up of a microcomputer, and controls the power supply from the vehicle-mounted battery 2 to the vehicle-mounted personal computer 3 based on previously stored various power supply control programs. A positive terminal 2a of the vehicle-mounted battery 2 is connected to a fixed contact 17a of a selectable switch 17 via a reset switch 15 and a switching circuit 16, and is connected to a power supply input terminal of the power supply controller 14 via a movable contact 17c. Another fixed terminal 17b of the selectable switch 17 is connected to a positive terminal of an auxiliary battery 18. The rest switch 15 is a normally on switch, which turns off only when an operation pressing force is acted to a movable terminal, and acts as a hard-reset switch. The movable terminal of the selectable switch 17 can be switched by the power supply controller 14.

The power supply controller 14 is connected to the signal generating circuit 12 and receives the start-up signal. A voltage measuring circuit 19 is connected to the power supply controller 14. The voltage measuring circuit 19 measures an input voltage inputted from the vehicle-mounted battery 2 or the auxiliary battery 18 via the selectable switch 17, and outputs measured data to the power supply controller 14. Furthermore, an alarm circuit 20 is connected to the power supply controller 14, so as to perform an alarm operation by receiving an alarm signal.

A power supply output terminal of the power supply controller 14 is connected to the vehicle-mounted personal computer 3 via an anti-instant outage circuit 21. The anti-instant outage circuit 21 is constructed so that power supply can be continued for a short time even if the output voltage is temporally stopped as a result of the switching operation of the selectable switch 17 or the other reasons.

In the vehicle-mounted personal computer 3, a main controller 22 has a CPU having normal personal computer functions including loading (reading) operation system (OS) and application program from the HDD unit 5, and executing them. The main controller 22 is powered by the power supply controller 14 of the main power supply circuit 1 via the anti-instant outage circuit 21. A monitor circuit 23 is for monitoring the output voltage of the vehicle-mounted battery 2. A detecting terminal is connected to a common connecting portion of the reset switch 15 and the switching circuit 16. The monitor circuit 23 monitors whether the output voltage is within a predetermined set voltage range or not, and outputs a power supply abnormality signal to the main controller 22 when a voltage level of the putout voltage is not within the set voltage range.

A signal line is connected between the main controller 22 and the power supply controller 14 of the main power supply circuit 14, so as to realize a bidirectional communication between the main controller 22 and the power supply controller 14. A bus (an address bus and a data bus) 24, which assigns address and communicates (sends or receives) data for performing data communication, is connected to the main controller 22. The display 4 is connected to the bus 24 via a display controller 25, and the HDD unit 5 and the CD-ROM unit 6 are connected to the bus 24 via a hardware controller 26. Furthermore, a ROM 27, a RAM 28 are connected to the bus 24, and the vehicle speed recorder 7 and the other vehicle-mounted devices 8a and 8b are connected to the bus 24 via an external device I/F (interface) circuit 29. Here, the display 4 is assumed to be a liquid crystal display unit containing a backlight.

Figure 2:
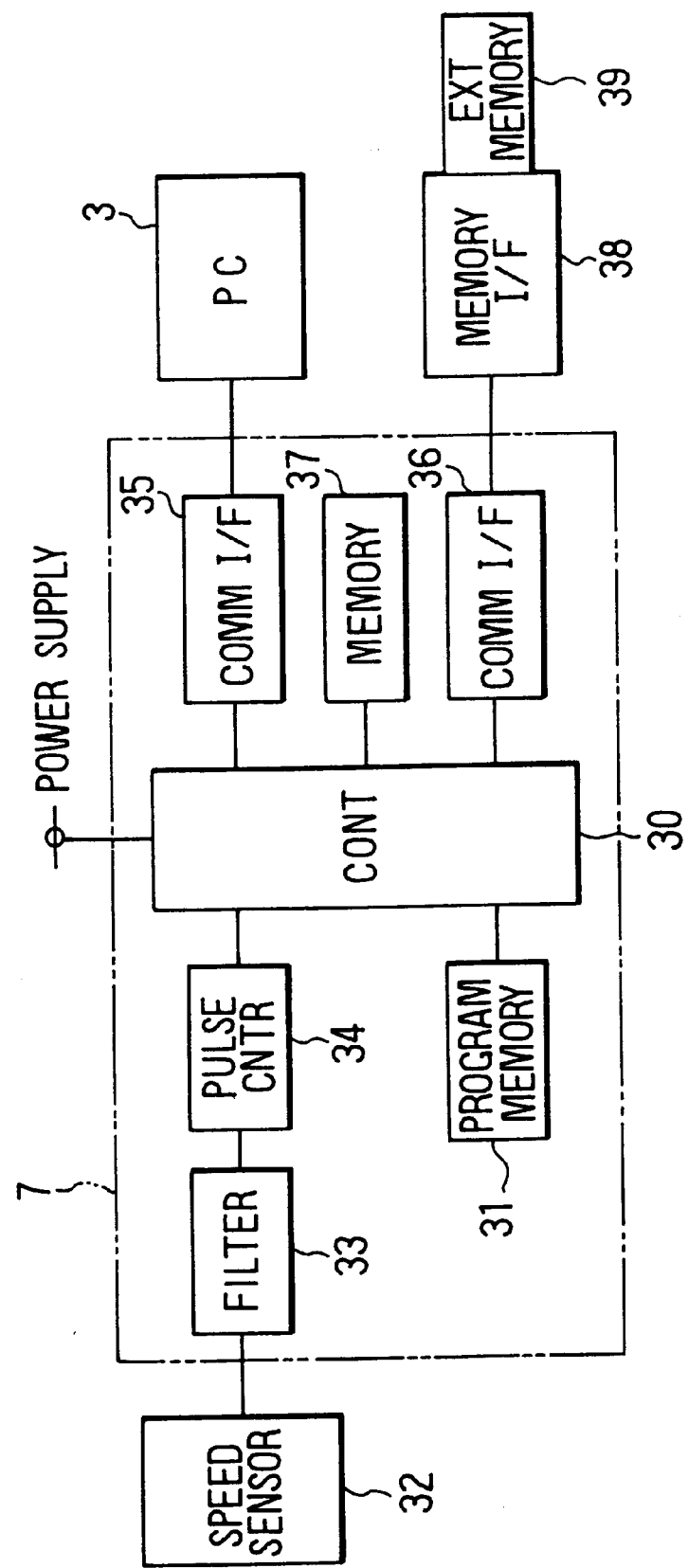
FIG. 2 is a block diagram illustrating a vehicular speed recorder.

Next, a construction of the vehicle speed recorder 7 will be explained with reference to FIG. 2. In this figure, a controller 30 is mainly made up of a microcomputer, and detects the vehicle speed based on a program stored in a program memory 31. A vehicle speed sensor 32 is for outputting a pulse signal including pulses in proportion to rotations of a wheel, and is made up so that four pulses are outputted per one rotation of the wheel. The pulse signals outputted from the vehicle speed sensor 32 are inputted to a pulse counter 34, which counts the number of the pulses, via a filter 33. The number of the pulses is inputted to the controller 30.

Communication interfaces 35 and 36, and a memory 37 are connected to the controller 30. The communication interface 35 is connected to the vehicle-mounted personal computer 3, so that data is communicated between the vehicle-mounted personal computer 3 and the controller 30. Furthermore, a memory interface 38 is connected to the communication interface 36 for mounting a detachable external memory 39 such as an IC card or a memory card. When the external memory 39 is mounted to the memory interface 38, the memory interface 38 enables data communication between the external memory 39 and the controller 30.

Next, an operation of this embodiment will be explained. Hereinafter, functions in connection with the power supply of both the main power supply circuit 1 and the vehicle-mounted personal computer 3 will be explained by dividing based on process functions, and further a function in connection with the vehicle speed recorder 7 will be explained.

In detail, when the vehicle-mounted personal computer 3 is mounted on the vehicle and is initially turned on, "(1) a start-up process" is firstly executed by the main power supply circuit 1. After the start-up, "(2) a voltage monitor process" is executed by the main power supply circuit 1 to monitor a supply voltage at a normal operation condition. Furthermore, when the key switch is turned off and is turned an again, "(3) a moving process" is executed by the main power supply circuit 1.

In response to these processes of the main power supply circuit 1, "(4) various process operations" are executed in the main controller 22 in the vehicle-mounted personal computer 3. Furthermore, "(5) vehicle speed detection of the vehicle speed recorder 7", which is performed while the key switch is OFF, will be explained.

(1) Start-up Process by the Main Power Supply Circuit 1

Figure 3:
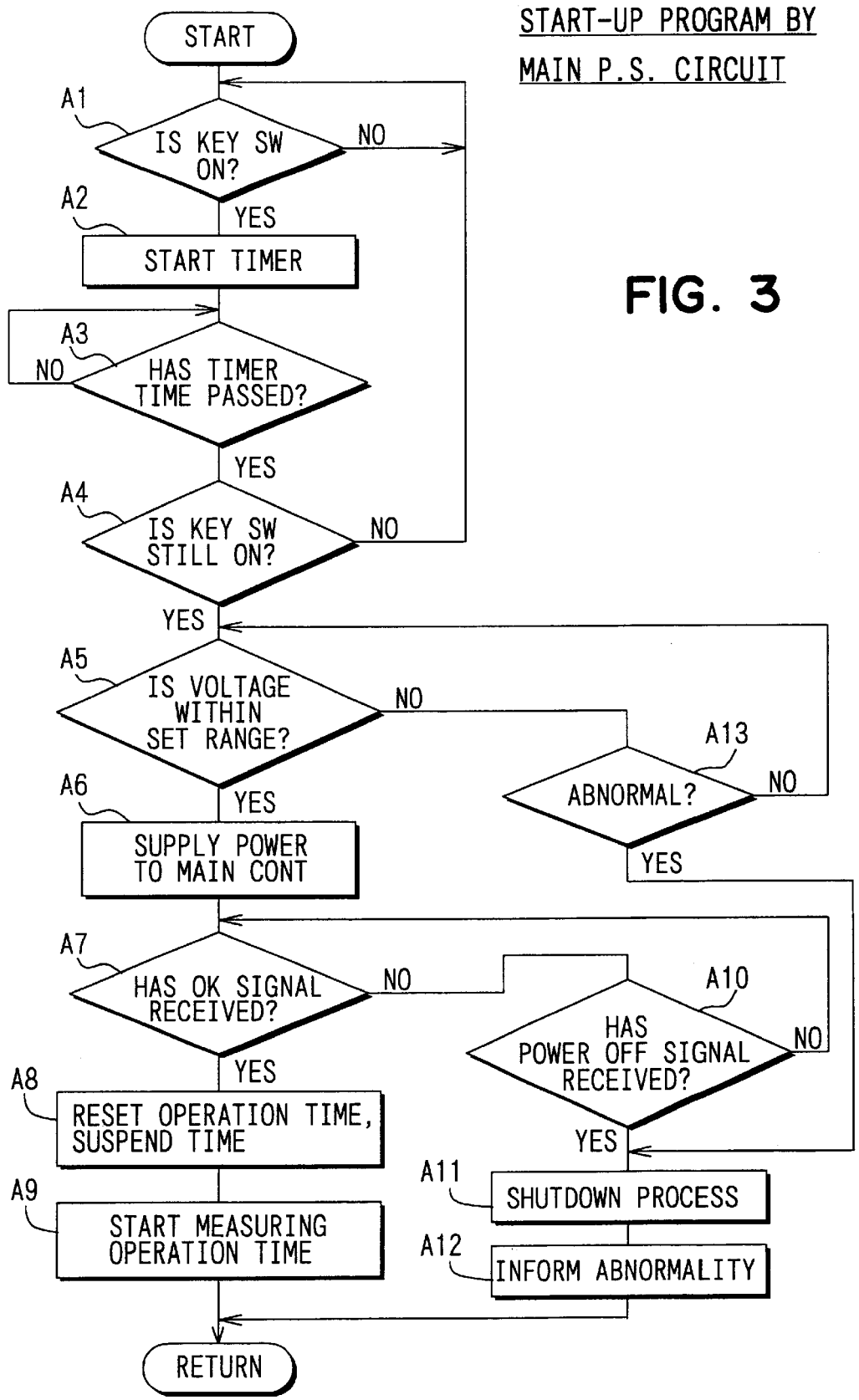
FIG. 3 is a flowchart illustrating a start-up program executed by a main power supply circuit.

In a condition where the vehicle-mounted personal computer 3 is mounted on the vehicle and the vehicle-mounted personal computer 3 is connected to the vehicle-mounted battery 2 via the reset switch 15, the main power supply circuit 1 firstly executes the start-up process based on a start-up program shown in FIG. 3 in a not-shown main program. Here, in this embodiment, both of the operation of the power supply controller 14 and the operation of the start-up circuit 9 will be explained as parts of the start-up program. Here, in this embodiment, the operation in connection with the start-up circuit 9 is performed by hardware, and the operation of the power supply controller 14 is performed by software. However, all of these operations may be performed by software, or may be performed by hardware.

At an initial condition, in the main power supply circuit 1, a power supply path is formed from the vehicle-mounted battery 2 to the power supply controller 14 through the reset switch 15, the switching circuit 16 and the selectable switch 17. The main power supply circuit 1 starts up the start-up program shown in FIG. 3 under a condition where an operation power is supplied.

At first, a condition signal of the key switch 13 is inputted to the start-up circuit 9 of the main power supply circuit 1. The start-up circuit 9 judges whether the key switch has been turned on or not (step A1). When the key switch 13 is turned on to start up the engine to start driving the vehicle, the start-up circuit 9 starts the count-up operation by starting a timer operation (step A2). When the counter value reaches a predetermined timer time, the start-up circuit 9 moves to step A4 if the key switch is kept on a ON condition (step A3).

In this way, the main power supply circuit 1 can recognize that an output voltage of the vehicle-mounted battery returns to a stable condition by passing a fluctuating period during which the output voltage falls due to start-up the engine. The timer time (counter value) is determined to an adequate value longer than the fluctuating period during which the output voltage fluctuates due to start-up the engine, so that the output can be regarded as the stable condition at a time when the engine is started up. Here, when the start-up circuit 9 determines that the key switch is a OFF condition at step A4, the start-up circuit 9 returns to step A1 by regarding that the key switch 13 is not accurately operated to the ON condition.

Next, the power supply controller 14 judges whether the output voltage of the vehicle-mounted battery 2 measured by the voltage measuring circuit 19 is within a predetermined set range or not (step A5). When the output voltage of the vehicle-mounted battery 2 is within the set range, the power supply controller 14 supplies power to the main controller 22 of the vehicle-mounted personal computer 3 via the anti-instant outage circuit 21 (step A6). When the main controller 22 of the vehicle-mounted personal computer 3 is powered, the main controller 22 performs a predetermined start-up operation as described later, and performs a hardware check during the start-up. When there is no abnormality (FIG. 6: steps D2–D4) in the hardware check, the main controller 22 sends a hardware-check OK signal to the power supply controller 14 of the main power supply circuit 1.

When the power supply controller 14 receives the hardware-check OK signal (step A7), the power supply controller 14 resets the counter of the operation time and the suspend time (step A8), and returns to the main program after start-up the operation time (step A9).

In this case, when the hardware-check OK signal is not received, the power supply controller 14 keeps on waiting with judging whether a power off signal is inputted or not.(steps A10 and A7). When the vehicle-mounted personal computer 3 sends the power off signal, the power supply controller 14 performs a shutdown process by regarding that some abnormal condition may occur (step A11). Furthermore, the power supply controller 14 displays or informs an occurrence of the abnormality (step A12), and returns to the main program.

On the contrary, when the power supply controller 14 decides that the output voltage of the vehicle-mounted battery 2 is not within the set range, the power supply controller 14 keeps on waiting with judging whether the abnormality occurs or not (steps A13 and A15). When the abnormality has occurred, the power supply controller 14 performs the shutdown process (step A11), displays or alarms the abnormality (step A12), and returns to the main program.

In this way, even when some abnormal condition occur at the side of the vehicle-mounted personal computer 3, since the power supply controller 14 can immediately detect the abnormality and perform the shutdown process, it can prevent data from being damaged.

(2) Voltage Monitor Process by the Main Power Supply Circuit 1

When the power supply controller 14 returns to the main program, the power supply controller 14 monitors both the output voltage of the vehicle-mounted battery 2 and a turning off of the key switch 13, with keeping on the power supply to the vehicle-mounted personal computer 3. Here, a monitoring of the output voltage of the vehicle-mounted battery 2 will be explained with reference to a battery check process program shown in FIG. 4, which is performed as an interruption process. The battery check process program is performed by being linked with the battery process program executed in the vehicle-mounted personal computer 3. The battery check process program is repeatedly executed every a particular cycle, which is shorter than an upper limit, during which even if the vehicle-mounted battery 2 starts to fall, a power source can be switched to the auxiliary battery 18.

After starting the battery check process, the power supply controller 14 waits for receiving one of a normality signal, which is outputted as a result of performing the battery check process (FIG. 7: steps E1–E4) in the vehicle-mounted personal computer 3, and a battery switching command signal (BTSW signal) (steps B1, B2). When the normality signal is received, the power supply controller 14 returns to the main program by regarding that the output voltage of the vehicle-mounted battery is normal.

Figure 8:
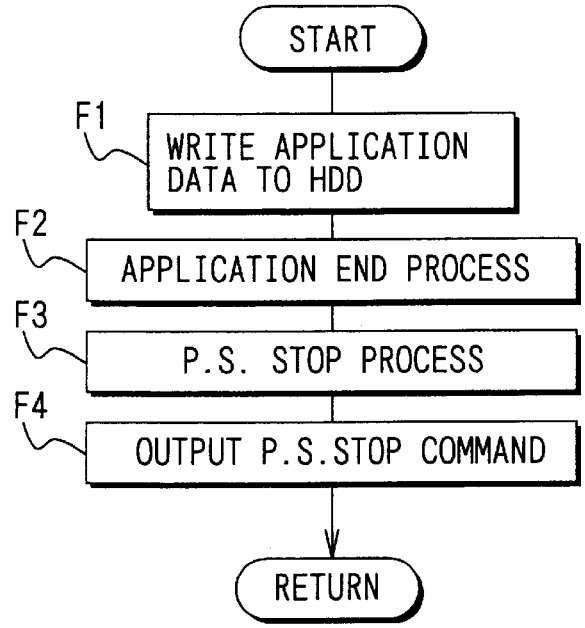
FIG. 8 is a flowchart illustrating a normal end process executed by the main controller.

On the contrary, when the battery switching command signal is received, the power supply controller 14 switches the power source to the auxiliary battery 18 (step B3). After that, when the power supply controller 14 receives a power supply stop signal (step B4), which is outputted when a normal end process (FIG. 7: step E6; FIG. 8) executed by the vehicle-mounted personal computer 3 ends, the power supply controller 14 executes a power supply stopping process (step B5) to terminate the program.

In this case, since the anti-instant outage circuit 21 is provided at the power supply path to the vehicle-mounted personal computer 3, the power can be supplied during a power outage period, which is a period from a switching the selectable switch 17 to a connecting to the auxiliary battery. As a result, it can prevent an power outage from occurring due to a switching process.

(3) Moving Process by the Main Power Supply Circuit 1

Next, three processes will be explained with reference to FIG. 5. First process is a moving process in connection with a turning-off operation of the key switch performed during supplying the power to the vehicle-mounted personal computer 3. Second process is a reset process during a sleep suspend condition as a result of the OFF operation. Third process is a moving process is in connection with a turning on operation of the key switch 13 during the sleep suspend condition.

When the key switch 13 is turned off, the power supply controller 14 recognizes this via the start-up circuit 9, and starts a moving process program shown in FIG. 5. The power supply controller 14 waits for inputting a suspend moving signal outputted from the vehicle-mounted personal computer 3 (steps C1 and C2). The turning-off operation of the key switch 13 is also recognized by the vehicle-mounted personal computer 3 (FIG. 6: step D6), and the suspend moving signal is outputted as a result of performing a sleep suspend process (FIG. 9) as described later. Since the suspend moving signal is outputted from the vehicle-mounted personal computer 3 within a predetermined time at a normal condition, the power supply controller 14 moves to step C3, so as to stop the count-up operation of the operation time and to start the suspend time (step C4). At this timing, the vehicle-mounted personal computer 3 has moved to the sleep suspend condition as described later.

Figure 11:
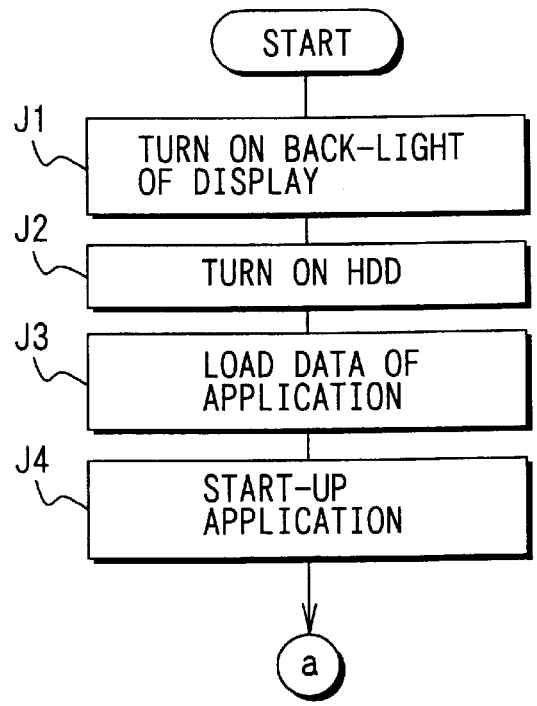
FIG. 11 is a flowchart illustrating a resume process executed by the main controller.

After that, the power supply controller 14 keeps on waiting with judging whether a cumulated operation time (sum of the operation time and the suspend time) exceeds a predetermined set time (e.g., 24 hours) or not until the key switch 13 is turned on (steps C5–C7). When the key switch 13 is turned on, the power supply controller 14 moves from step C5 to step C8. The power supply controller 14 waits for the start-up signal, which is outputted from the start-up circuit, after passing a predetermined timer time (step C9). When the key switch is kept on the ON condition (step C10), the power supply controller 14 outputs a resume command to the vehicle-mounted personal computer 3 (step C11), and returns to the main program. After returning to the main program, the power supply controller 14 waits for turning off the key switch 13 again with performing the above-described voltage monitor process. When the vehicle-mounted personal computer 3 receives the resume command, the vehicle-mounted personal computer 3 returns to the condition before moving the sleep suspend condition as described later (FIG. 11).

When the power supply controller 14 judges that the cumulated time exceeds the set time before the key switch 14 is turned on (step C7), the power supply controller 14 moves to step C12 to perform the reset process with respect to the vehicle-mounted personal computer 3. This process can prevent the vehicle-mounted personal computer 3 from becoming a unstable condition or causing a freeze condition as a result of long time operation under the general purpose OS. Since this process is executed at the condition where the vehicle-mounted personal computer 3 is under the sleep suspend condition, it can prevent the reset process from affecting the operation of the vehicle-mounted personal computer 3.

After that, the power supply controller 14 resets (initializes) the operation time and the suspend time (step C13), and returns to step C1. On the contrary, since the reset process is performed, the vehicle-mounted personal computer 3 performs a restart process. When the key switch 13 is still OFF condition until that time, the vehicle-mounted personal computer 3 moves to the sleep suspend process, and outputs the suspend moving signal after moving to the sleep suspend process. Therefore, the power supply controller 14 returns to a loop of steps C5–C7, and moves to a waiting condition again.

While the power supply controller 14 waits for inputting the suspend signal at steps C1 and C2, when the set time is passed without receiving the suspend moving signal from the vehicle-mounted personal computer 3, the power supply controller 14 determines as an abnormal condition that some trouble occurs in the vehicle-mounted personal computer 3 (step C14), and sends a control signal for moving the vehicle-mounted personal computer 3 to a power off mode (step C15). After that, the power supply controller 14 resets the vehicle-mounted personal computer 3 (steps C12 and C13), and returns to step C1.

In the above-described abnormal condition, the absence of the suspend moving signal within the set time may be caused by the following reason, that is, it took long time to communicate data between the vehicle-mounted personal computer 3 and the HDD unit 5. In such a case, when the vehicle-mounted personal computer 3 is reset after data communication between the HDD unit 5 has successfully completed, the suspend moving signal is outputted by executing the sleep suspend process again under the condition where the key switch 13 is OFF condition. Therefore, the power supply controller 14 returns to a loop of steps C5–C7, and moves to a waiting condition again.

(4) Various Process Operations of the Main Controller 22

Next, various process operations of the main controller 22 of the vehicle-mounted personal computer 3 in connection with the above-described operations of the main power supply 1 will be explained with reference to FIGS. 5 through 11. Here, the various operations will be explained in order of the operations executed by the main power supply circuit 1. At first, the main controller 22 performs a start-up process based on a control program shown in FIG. 6 at its start-up. Since the output voltage of the vehicle-mounted battery 2 as the power source is stable at the time when the power is supplied from the main power supply circuit 1, there is no voltage fluctuation during the start-up, and the vehicle-mounted personal computer 3 can communicate with the HDD unit 5 without fail.

The main controller 22 performs a boot load by accessing the ROM 27 (step D1), and performs a hardware check based on a boot program (step D2). When there is no abnormal condition in the devices connected to the main controller 22 (step D3), the main controller 22 outputs a hardware-check OK signal (step D4). After that, the main controller 22 reads the OS and the application program stored in the HDD unit 5 (step D5), and then starts up the application program on the OS (step D6).

While the application program is executed (step D7), the main controller 22 judges whether or not there are any abnormalities, which disturb a process of the application program (step D8). When there is no abnormality, the main controller 22 judges whether the key switch 13 is turned off or not (step D9). When the key is not turned off, the main controller 22 returns to step D7. That is, a loop of steps D7–D9 is repeated until the key is turned off. Furthermore, in this condition, the main controller 22 executes the battery check process shown in FIG. 7 as an interruption process to detect the output voltage of the vehicle-mounted battery 2. As described the above, this battery check process is repeatedly executed every a particular time, during which the main controller 2 can detect a falling of the output voltage of the vehicle-mounted battery 2 even if the output voltage falls and can perform a stop process.

In the battery check process shown in FIG. 7, the main controller 22 firstly detects the output voltage of the vehicle-mounted battery 2 via the monitor circuit 23 (step E1), and judges whether a detected output voltage is within a set voltage range or not (step E2). When the detected output voltage is within the set voltage range, the main controller 22 outputs a vehicle-mounted battery normality signal (step E3), and returns to the control program. On the contrary, when the detected output voltage is not within the set voltage range at step E2, the main controller 22 outputs the battery switching command signal (BTSW signal) to the main power supply circuit 1 (step E4), and then displays a notice on the display 4 that there is a power supply abnormality (step E5). After that, the main controller 22 executes a normal end process (step E6), and terminates this program. The normal end process will be explained with reference to FIG. 8. At first, the main controller 22 writes various data, which is used by the ongoing application program, into the HDD unit 5 so that the data is escaped to the HDD unit 5 (step F1). After that, the main controller 22 closes the application program (step F2), so that it moves to a safety condition in which the power supply can be stopped. After that, the main controller 22 outputs the power supply stop signal to the main power supply circuit 1, and returns to the battery check process.

According to the above-described processes, even when the power source is switched to the auxiliary battery as a result of an occurrence of the abnormality due to a falling down of the output voltage from the vehicle-mounted battery 2, the main controller 22 can certainly continue the stop process for stopping the power supply. Therefore, when the vehicle-mounted personal computer 3 is restarted after the output voltage from the vehicle-mounted battery 2 is restored by being exchanged or charged, the vehicle-mounted personal computer 3 can restart with the same condition as that before the stop process without causing any inconvenience to the operation of the application program.

Here, when the key switch 13 is turned off (step D9) during the loop of steps D7–D9 of the control program, the main controller 22 moves to the sleep suspend process program shown in FIG. 8 to perform a sleep suspend process (step D10), and then moves to a sleep mode (step D11).

Figure 6:
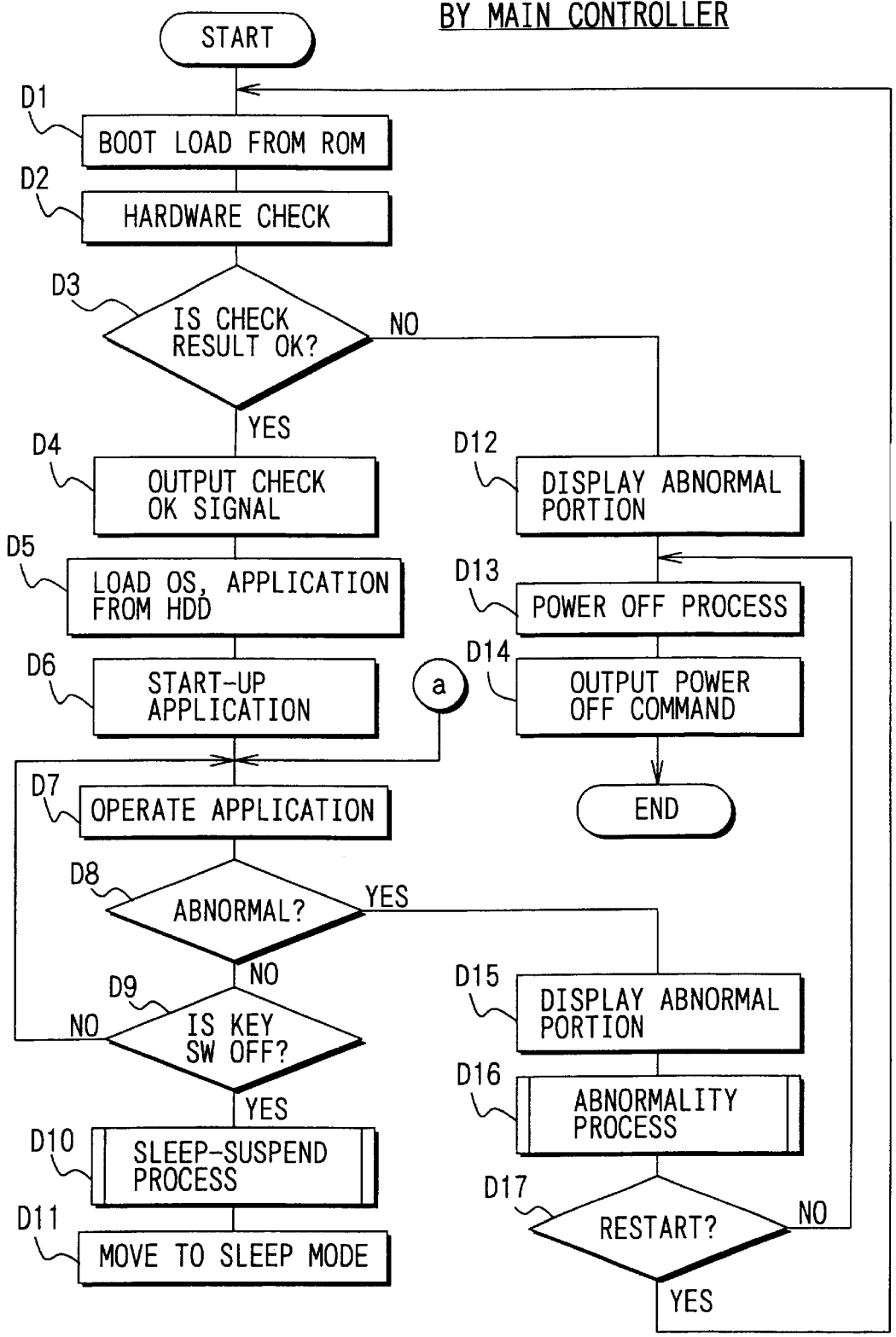
FIG. 6 is a flowchart illustrating a control program executed by a main controller.
Figure 9:
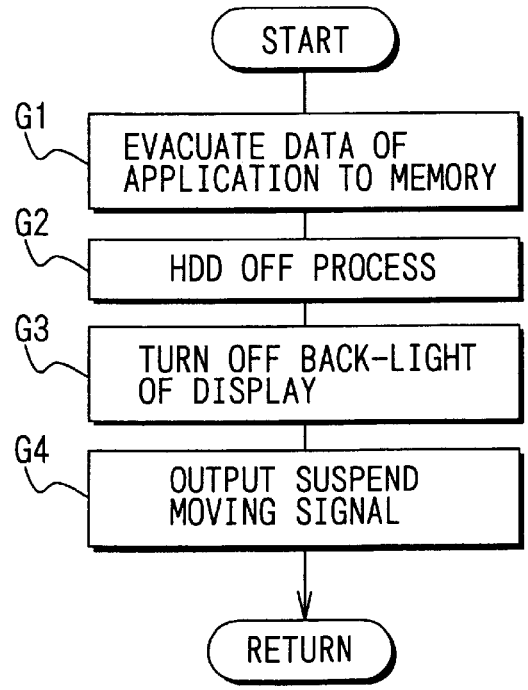
FIG. 9 is a flowchart illustrating a sleep-suspend process executed by the main controller.
Figure 10:
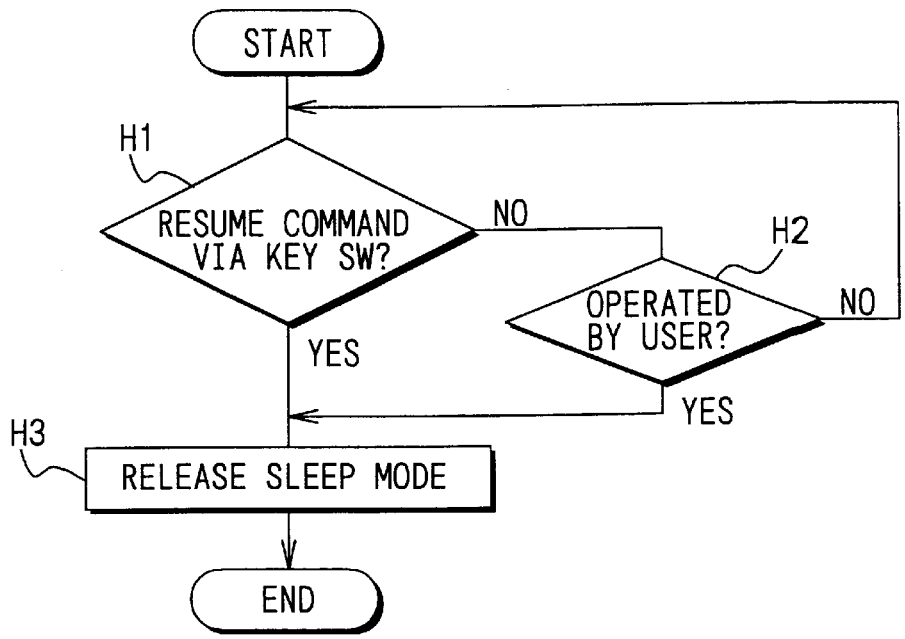
FIG. 10 is a flowchart illustrating a resume detection process under a sleep-condition, executed by the main controller.

FIG. 9 shows a program of the sleep suspend process. The main controller 22 evacuates the various data used by the ongoing application program to the RAM 28 or the HDD unit 5 (step G1), then turns off the HDD unit 5 (step G2), and then turns off the backlight of the display 4 (step G3). After that, the main controller 22 outputs the suspend moving signal to the main power supply circuit 1 (step G4), and returns to the control program (FIG. 6). After returning to the control program shown in FIG. 6, the main controller 22 moves to the sleep mode (step D11).

Here, the sleep mode is a low power consumption mode in which the main controller 22 only performs minimum necessary operation to largely save the power consumption. In this sleep mode, the main controller receives only a command for returning from the sleep mode. In detail, the main controller executes a program shown in FIG. 10. That is, the main controller 22 judges whether or not there is the resume command via the turning-on operation of the key switch 13 (step H1). When there is no such the resume command, the main controller 22 moves to step H2, so as to judge whether or not there is an operation of the other vehicle-mounted device 8a or 8b by user. When there is no operation by the user, the main controller 22 returns to step H1. When main controller 22 determines that there is one of the resume command and the operation by the user during a loop of steps H1 and H2, the main controller 22 outputs a sleep mode releasing process command, and then terminates this program.

Next, the main controller 22 executes a resume process shown in FIG. 11. The main controller 22 turns on the backlight of the display 4 (step J1), turns on the HDD unit 5 (step J2). After that, the main controller 22 loads (reads) the application program (step J3), and starts up the application program (step J4). Then, the main controller 22 moves to step D7 in FIG. 6, so as to detect the output voltage from the vehicle-mounted battery 2 (FIG. 7) with detecting the turning-off of the key switch 3 or occurrence of the abnormality (steps D7–D9).

Here, a process of the main controller 22 in which the abnormality occurs at step D3 in the control program shown in FIG. 6 will be explained. When there is the abnormality in the hardware check result, the main controller 22 displays an abnormal position on the display 4 (step D12). The main controller 22 performs a power off process (step D13), outputs a power off command to the main power supply 1 (step D14), and terminates the program. As a result, the power supply to the vehicle-mounted personal computer 3 is stopped before the vehicle-mounted personal computer 3 is started up.

When there is an abnormality in the loop of steps D7–D9 in the control process, the main controller 22 displays an abnormal position on the display 4 (step D15), and performs an abnormality process (step D16). In this case, although being not shown in this figure, in detail, the main controller 22 judges whether the abnormality is due to the application program, due to the various devices, or due to a power supply line. Furthermore, the main controller 22 detects whether the abnormality is restorable or not.

When the abnormality is restorable, the main controller 22 returns the start-up process of the step D1 through the step D7 in order to restart. After that, the main controller 22 outputs the power off command signal, so that the program is closed.

As described the above, the main controller 22 of the vehicle-mounted personal computer 3 performs the start-up process, the battery check process, the sleep suspend process and so on in accordance with the operations of the main power supply circuit 1. As a result, the main controller 22 can improve reliability by reducing the power consumption and by adequate process during the abnormal condition without fail.

(5) Vehicle Speed Detection of the Vehicle Speed Recorder 7

Figure 12:
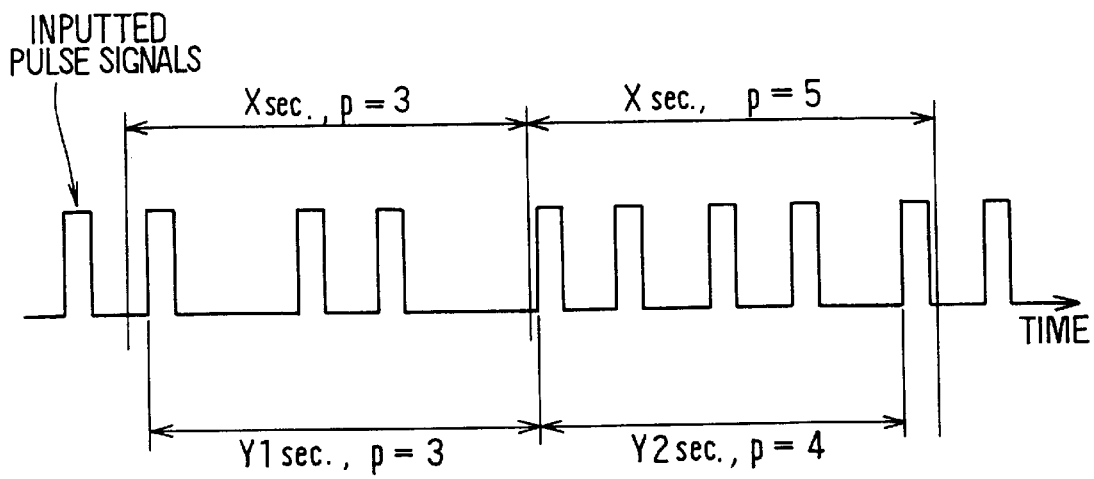
FIG. 12 is a diagram illustrating a principal of vehicular speed detection by a vehicular speed recorder.

Next, an operation of the vehicle speed recorder 7 will be explained with reference to FIG. 12. When it assumes that the vehicle starts to drive just after the start-up the engine, if the vehicle speed is detected after the start-up of the personal computer 3, vehicle speed data cannot be recorded between the start-up of the engine and the start-up of the vehicle-mounted personal computer 3. Therefore, in this embedment, the main controller 30 shown in FIG. 2 detects and stores the vehicle speed data. Here, the other devices other than the vehicle speed recorder 7, which need to be operated just after the start-up the engine, need to have a function for processing and storing data.

When the key switch 13 is turned on, the vehicle speed recorder 7 is powered by the vehicle-mounted battery 2. After that, the controller 30 reads program from built-in ROM and starts to detect the vehicle speed. The controller 30 repeatedly calculates the vehicle speed based on the number of the counted pulses inputted from the vehicle speed sensor 32 via the filter 33 and the pulse counter 34. The calculated vehicle speed data is stored in the memory 37 until the vehicle-mounted personal computer 3 is started up to be ready for communicating the data.

When the vehicle-mounted personal computer 3 is started up and is ready for communicating the data, the vehicle speed data stored in the memory 37 and the vehicle speed data calculated later are sequentially outputted in response to the request command inputted from the vehicle-mounted personal computer 3 via the communication interface 35. When the vehicle speed data is stored in the external memory 39 such as the IC card or the memory card, the vehicle speed data is transferred to the external memory 39 from the communication interface 36 via the memory interface 38.

Here, the vehicle speed recorder 7 calculates acceleration of the vehicle by calculating an amount of changes of the calculated vehicle speed data. In this case, for the purpose of improving an accuracy of the acceleration calculation, the acceleration may be calculated by applying a relationship between the vehicle speed and time to a quadratic function or more high degree function, and by calculating an inclination of the function curve at every timing.

When the calculated acceleration exceeds a predetermined speed range (a acceleration range can be determined so that a positive set value for suddenly acceleration, and a negative set value for suddenly deceleration), the controller 30 determines that it is a dangerous driving and records this acceleration or situation to the memory 37, external memory, or the vehicle-mounted personal computer 3.

The above-described acceleration detection can be performed based on the following mechanism. As described the above, the vehicle speed sensor 32 outputs four pulses per one rotation of the wheel. For example, when it assumes that a diameter of the wheel is about 50 cm, 2548 pulses are outputted per 1 km (=4 pulses×(1000/0.5 $\pi$) rotation). When travel speed is 60 km/h, the vehicle travels 1 km per 1 minute. Therefore, the controller 30 of the vehicle speed recorder 7 inputs 2548 pulses per 1 minute via the pulse counter 34.

Here, since a maximum speed of the vehicle is less than 300 km/h, at most, a maximum number of the outputted pulses is less than 12740 pulses (=2548×5) per one 1 minute, and is less than 212 pulses per 1 second. The filter 33 cuts particular signals whose frequency is higher than a particular frequency corresponding to the maximum number of the outputted pulses. The pulse counter 34 counts the pulses in the pulse signal inputted via the filter 33. The controller 30 calculates the vehicle speed based on the number of the counted pulses and measuring time.

In this case, there two ways to calculate the vehicle speed. One is a method in which the vehicle speed is calculated by the numbers of the counted pulses (p pulses) in the pulse signal inputted during a constant time X second, as shown by upper side arrows in FIG. 12. Another is a method in which the number of the counted pulses is determined by counting from a certain start time, at which certain pulse is detected, to an end time, at which a pulse inputted at nearest timing to the set time is detected, and calculating the vehicle speed by using the period between the start time and the end time as the detecting time Yn (n=1, 2, . . . ), as shown by lower side arrows in FIG. 12.

The former method is simple and can quickly calculate the vehicle speed. The latter method can precisely detect the vehicle speed. Either one of these methods may be applied or both of these methods may be applied.

Here, when it needs to record a drive behave of the drive, an interval of counting the pulses of the pulse signal is preferably set to less than 1 second. This is because the vehicle speed changes within 1 second from the driver's depressing a brake, when the driver applies suddenly brake. However, when the interval is set too short, the number of the detected data and calculation would increase. Therefore, it is preferable to set the interval to around 0.5 second.

According to this embodiment, the following effects can be achieved.

First, the power is supplied to the vehicle-mounted personal computer 3 after the main power supply circuit 1 recognizes the stable condition of the output voltage from the vehicle-mounted battery 2, when the key switch 13 is turned on. Therefore, it can prevent voltage fluctuation from affecting, while the vehicle-mounted personal computer accesses the HDD unit 5, in which the OS and the application program are stored.

Second, the vehicle-mounted personal computer 3 is moved to the sleep move when the key switch 13 is turned off. As a result, when the engine is not started up and the vehicle-mounted battery is not charged, the vehicle-mounted personal computer 3 is moved to the low power consumption mode. Furthermore, when the key switch 13 is turned on next, the vehicle-mounted personal computer 3 can perform a process operation with immediately restoring the condition.

Third, the output voltage from the vehicle-mounted battery is always monitored during operation. When the output voltage is not within the predetermined range, the power source is changed to the auxiliary battery to supply the power until the vehicle-mounted personal computer 3 can shut down the application or operation and can move to turning off condition. As a result, the process of the vehicle-mounted personal computer 3 can be ended even when the vehicle-mounted personal computer 3 accesses to the HDD unit 5, and therefore it can prevent the head or the disk of HDD unit 5 from being damaged or can prevent data from being damaged.

Fourth, when a continuous operation time of the vehicle-mounted personal computer 3 exceeds the predetermined long time such as 24 hours, and when the vehicle-mounted personal computer 3 is in the sleep mode, the main power supply circuit 1 have the vehicle-mounted personal computer 3 restarts. As a result, it can prevent the OS or the application program from being unstable in advance.

Fifth, the vehicle speed recorder 7 is provided with memory medium such as the memory 37 or external memory 39 for calculating the vehicle speed data and for storing it, the vehicle speed data obtained by the vehicle speed recorder 7 can be stored therein, even if the vehicle travels between the turning-on of the key switch 13 and the start-up of the application program of the vehicle-mounted personal computer 3. In this case, the stored data can be transferred after the vehicle-mounted personal computer 3 starts the operation process.

Second Embodiment

Figure 13:
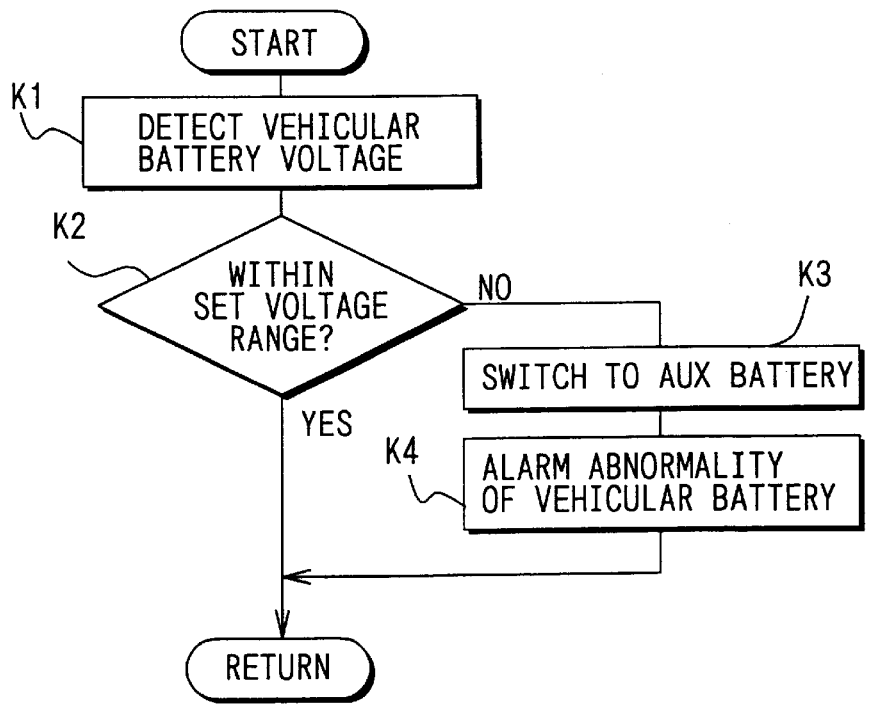
FIG. 13 is a flowchart illustrating a battery check process executed by the main power supply circuit of a second embodiment according to the present invention.
Figure 14:
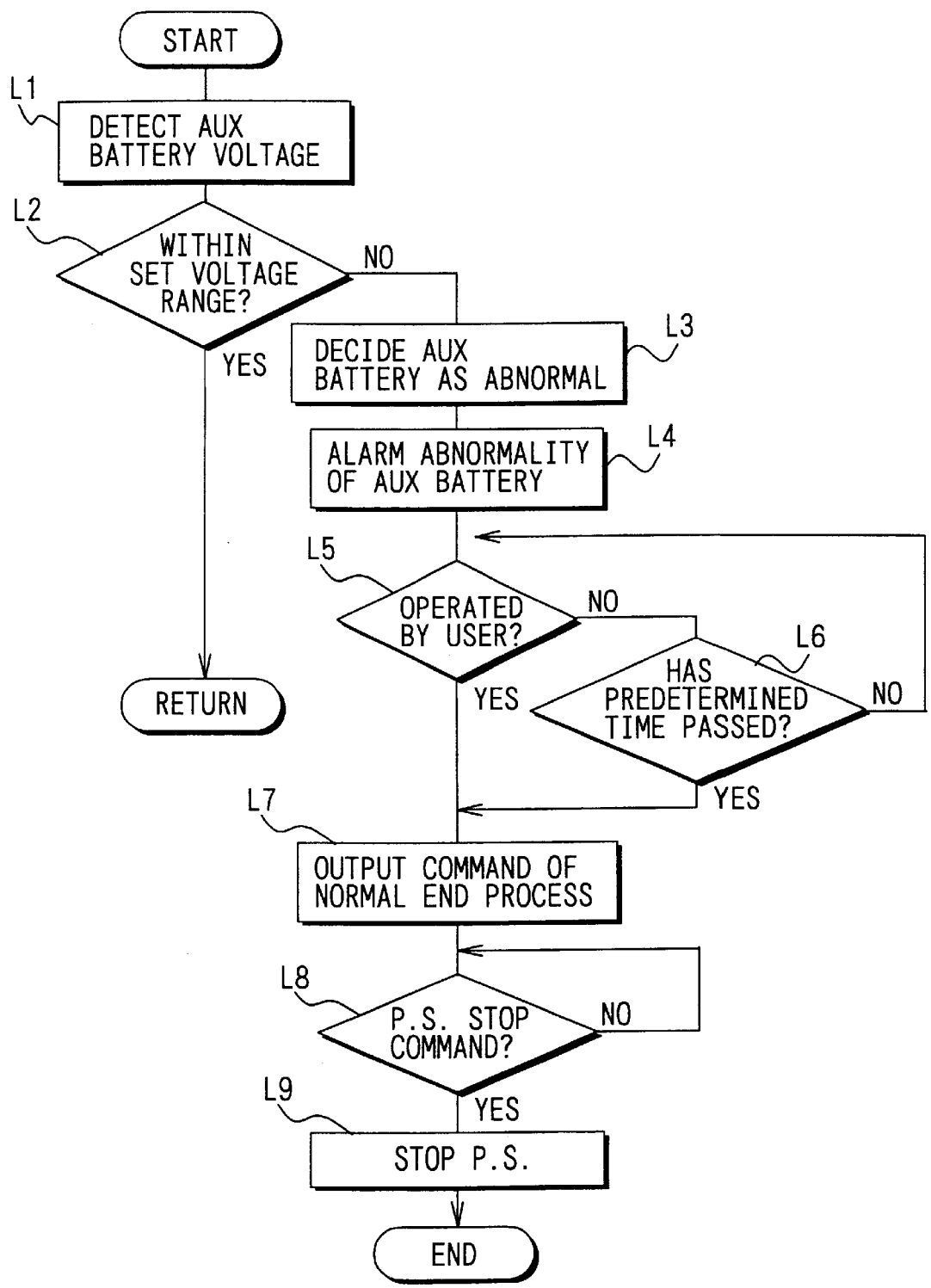
FIG. 14 is a flowchart illustrating an anxiously battery check process program executed by the main power supply circuit.

FIGS. 13 and 14 show a second embodiment of the present invention. Difference between the first embodiment and this embodiment is as follows. That is, when the power source is switched to the auxiliary battery 18 as a result of falling down of the voltage of the vehicle-mounted battery 2, the vehicle-mounted personal computer 3 is continuously operated, instead of being turned off. In this embodiment, the output voltage from the vehicle-mounted battery 2 is detected by both the vehicle-mounted personal computer 3 and the main power supply circuit 1.

In detail, the power supply controller 14 executes a program of a vehicle-mounted battery check process shown in FIG. 13 as an interruption process, instead of the above-described battery check process shown in FIG. 4. The power supply controller 14 detects the output voltage from the vehicle-mounted battery 2 (step K1). When the output voltage is within a set voltage range, the power supply controller 14 returns to the main program.

When the detected output voltage is not within the set voltage range, the power supply controller 14 switches the power source to the auxiliary battery 18 (step K3), alarms an abnormality of the vehicle-mounted battery 2 (step K4), and returns to the main program. In this situation, the vehicle-mounted personal computer 3 is being powered by the auxiliary battery 18 via the main power supply circuit 1, and continues the operation of the application program as well as the condition being powered by the vehicle-mounted personal computer 3.

When the vehicle-mounted personal computer 3 is powered by the auxiliary battery 18, the main power supply circuit 1 detects the output voltage from the auxiliary battery 18. FIG. 14 shows this program of the check process, which is executed as the interruption process as an adequate timing.

At first, the power supply controller 14 judges the output voltage from the auxiliary battery 18 via the voltage detected by the voltage detecting circuit 19 (step L1). When the detected output voltage is within a set voltage range (step L2), the power supply controller 14 returns to the main program by regarding that there is no problem. When the detected output voltage is not within the set voltage range, the power supply controller 14 decides that some abnormal condition occurs in the auxiliary battery (step L3), and alarms the abnormality of the auxiliary battery (step L4).

After that, the power supply controller 14 judges whether there is an operation by the user (step L5), moves to step L6 when there is no such the operation. The power supply controller 14 judges whether a predetermined time has passed or not (step L6), and returns to step L5 when the predetermined time has not passed. In this loop of steps L5 and L6, the power supply controller 14 waits for user's operation such as stop process in accordance with the alarming the abnormality. When there is the operation within the predetermined time or the predetermined time has passed, the power supply controller 14 outputs the normal end process command to the vehicle-mounted personal computer 3 (step L7). After that, the vehicle-mounted personal computer 3 executes the normal end process shown in FIG. 8, and the power supply controller 14 waits for inputting the power supply stop command (step L8). When the power supply stop command is inputted, the power supply controller 14 stops the power supply (step L9), and terminates the program.

As a result, even if the power is supplied from the auxiliary battery 18, the vehicle-mounted personal computer 3 can be operated as the normal condition, and can immediately perform the stop process when the output battery from the auxiliary battery starts to fall. Furthermore, in this situation, even when the HDD unit 5 is being accessed, the vehicle-mounted personal computer can moves to the power stop with certainly evacuate the ongoing data. Thus, it can prevent the head or the disk of HDD unit 5 from being damaged or can prevent data from being damaged.

Third Embodiment

Figure 15:
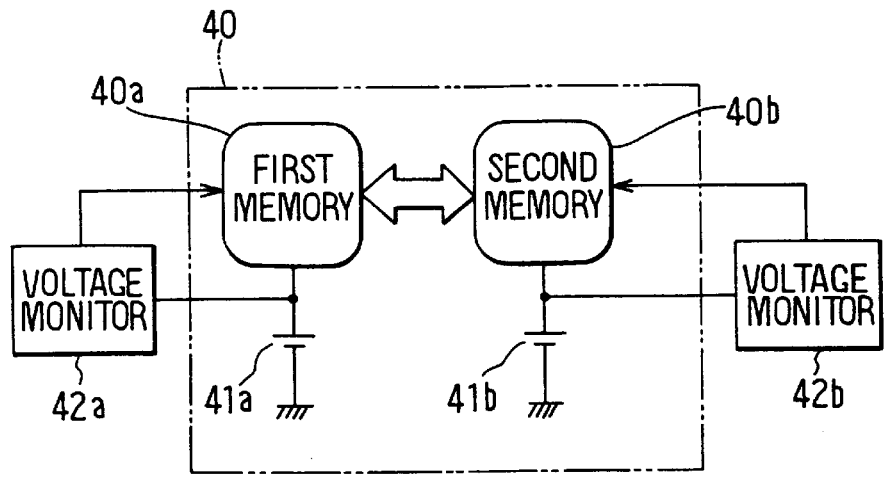
FIG. 15 is a schematic block diagram illustrating a storing portion of a third embodiment according to the present invention.

FIG. 15 shows a third embodiment of the present invention. In this embodiment, a semiconductor memory chip or a memory board having a similar function of the HDD unit 5 is used, instead of the HDD unit 5 as the memory means or memory medium. In this case, when the semiconductor memory chip or the memory board is a kind of volatile memory, it needs to backup the stored data by supplying a backup power. When it is a kind of non-volatile memory, it does not need to prepare such the backup power. In the following explanation, it assumes that the semiconductor memory chip or the memory board is a kind of the volatile memory.

In FIG. 15, a memory portion 40, which made up of the memory card or the memory board as the memory means or the memory medium, includes a two groups of storing region having a first storing portion 40a and a second storing portion 40b. Memory backup batteries 41a and 41b are respectively connected to the first and the second storing portions 40a and 40b, and terminal voltages of the memory backup batteries 41a and 41b are respectively monitored by voltage monitoring circuits 42a and 42b.

Each of the storing portions 40a and 40b are capable of transferring the data stored therein. For example, in a case where the memory backup battery 41a is exchanged, when the voltage monitor circuit 42a detects a falling of the terminal voltage of the memory backup battery 41a, the voltage monitor circuit 42a sends a command so that the data stored in the first storing portion 40a is transferred to the second storing portion 40b. Similarly, in a case where the memory backup battery 41b is exchanged, when the voltage monitor circuit 42b detects a falling of the terminal voltage of the memory backup battery 41b, the voltage monitor circuit 42b sends a command so that the data stored in the second storing portion 40b is transferred to the first storing portion 40a.

As a result, even if the terminal voltage of one of the memory backup batteries 41a and 41b is fallen, the data stored in one storing portion 40a or 40b corresponding to the one memory backup batteries is transferred to another storing portion 40b or 40a corresponding to another memory backup battery 41a or 41b, so that reliability can be improved.

Fourth Embodiment

Figure 16:
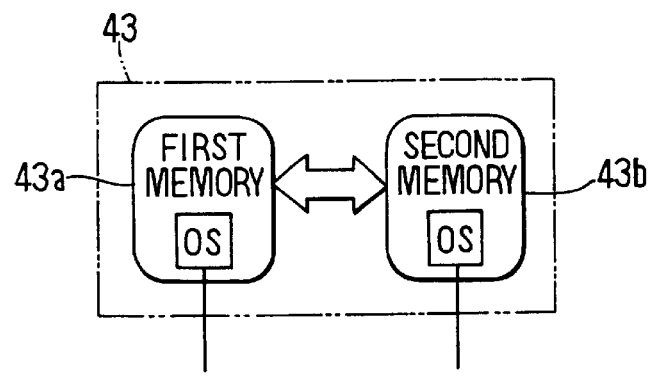
FIGS. 16 and 17 are schematic block diagrams illustrating a storing portion of a fourth embodiment according to the present invention.
Figure 17:
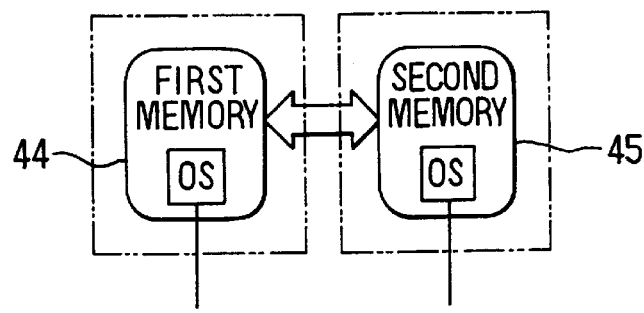

FIGS. 16 and 17 show a fourth embodiment of the present invention. This embodiment is different from the third embodiment in that a non-volatile memory 43 is used as the memory means or memory medium, which does not need the memory backup memory. In detail, a first storing portion 43a and a second storing portion 43b, each of which utilizes an EEPROM as the non-volatile memory, is provided. Furthermore, each of the storing portions 43a and 43b stores the OS, so that when one OS is unstable, the storing portion is detected by using another OS so as to restore to a stable condition.

Furthermore, as shown in FIG. 17, a first storing portion 43 and a second storing portion 44, each of which is separately contained in separate cases and is made up of the non-volatile memory, may be used instead of the non-volatile memory 43. In this case, since each of the storing portions 44 and 45 is individually fixed, when one of the storing portions 44 and 45 indicates abnormality, the one storing portion 44 or 45 can be separately investigated and can be replaced with newly one.

The present invention is not limited to the above-described embodiments, and can be modified and expanded.

In the above-described embodiments, the vehicle-mounted personal computer 3 is used for exemplifying the data processor, however, the present invention can be applied to a vehicular navigation system, which communicates data or program with a HDD unit or a memory, or can be a vehicular device, which performs an automatic charging process. Furthermore, the present invention can be applied to any device for processing data, which communicates data with storing means.

The present invention can be applied to an electric vehicle, other than the internal combustion engine vehicle, and can be applied to the other movable means driven by using battery. Furthermore, the present in invention can be applied to any devices having a battery, whose voltage may fluctuate due to other system commonly connected to the battery.

In the above-described embodiment, the start-up circuit 9 has a delay time function, and the power is supplied after the ON operation of the key switch 13 with delaying certain time by using the delay time function. Here, the power may be supplied after directly detecting the output voltage from the vehicle-mounted battery 2 and after ascertaining that the detected output voltage is within a stable condition. Furthermore, both the delay time function and the voltage detection function may be provided to the start-up circuit 9. In this case, the reliability can be further improved.

In a case where the present invention is applied to a commercial vehicle, it is preferable that the power of the vehicle-mounted personal computer 3 is not turned off. In this case, alike the first embodiment, it is preferable not to provide a power supply switch, so that the power is always supplied. When the power supply to the vehicle-mounted personal computer 3 is turned off by intentionally operation by the user, it is preferable to perform a stop process after storing the of f operation or sending information indicating the off operation to an administrator. As a result, an administrating function can be improved.

The auxiliary battery 18 is preferably selected from a one, which can be charged, however, the auxiliary battery may be selected a primary battery.

What is claimed is:

1. A power supply apparatus for supplying power from a main power supply to a data processor, for communicating data with a memory medium, and at least one other load, the power supply apparatus comprising:

a start-up circuit connected to the main power supply and operable to determine when an output voltage of the main power supply is in a stable condition after a fluctuating period of the output voltage during which the at least one other load was energized; and a power supply controller connected to the main power supply and operable to initiate the supply of power from the main power supply to the data processor when the output voltage of the main power supply is in the stable condition, wherein the power supply controller measures a power supply time to the data processor, and restarts the data processor when the power supply time exceeds a predetermined time.

2. A power supply apparatus according to claim 1, wherein the power supply apparatus is to be mounted on a movable body having:

a battery as the main power supply;

a driving device as said at least one other load powered by the battery, for driving the movable body; and a key switch for start-up the driving device.

3. A power supply apparatus according to claim 2, wherein the power supply controller controls the data processor to move to a low power consumption mode during which the data processor operates at low power compared to a normal operation, when the driving device is stopped.

4. A power supply apparatus according to claim 3, wherein the power supply controller controls the data processor to return from the low power consumption mode to the normal operation, when the start-up circuit detects the stable condition of the output voltage form the main power supply during the low power consumption mode.

5. A power supply apparatus according to claim 3, wherein the power supply controller restarts the data processor, when the data processor is in the low power consumption mode and the power supply time exceeds the predetermined time.

6. A power supply apparatus according to claim 1, wherein:

the start-up circuit receives a start-up signal outputted from said the other loads, and the start-up circuit determines the output voltage from the main power supply as the stable condition, when a predetermined delay time has passed after receiving the start-up signal.

7. A power supply apparatus according to claim 1, further comprising:

a voltage detector for detecting the output voltage from the main power supply, wherein:

the start-up circuit receives a start-up signal outputted from said the other loads, and the start-up circuit determines the output voltage from the main power supply as the stable condition, when the output voltage detected by the voltage detector is within a predetermined stable voltage range.

8. A power supply apparatus according to claim 1, further comprising a power supply monitor for monitoring the output voltage from the main power supply, and for detecting an abnormal condition of the main power supply when the output voltage is lower than a predetermined voltage, wherein the power supply controller turns off the data processor when the abnormal condition of the main power supply is detected by the power supply monitor.

9. A power supply apparatus according to claim 1, further comprising:

a power supply monitor for monitoring the output voltage from the main power supply, and for detecting an abnormal condition of the main power supply when the output voltage is lower than a predetermined voltage, and an auxiliary power supply capable of supplying power to the data processor, wherein the power supply controller switches the power supply to the data processor from the main power supply to the auxiliary power supply, when the abnormal condition of the main power supply is detected by the power supply monitor.

10. A power supply apparatus according to claim 9, wherein the power supply controller stops the data processor, when the power supply is switched from the main power supply to the auxiliary power supply.

11. A power supply apparatus according to claim 1, wherein the memory medium is selected from one of a hard disc unit and semiconductor memory.

12. A power supply apparatus according to claim 1, wherein said at lest one other load is a starter motor for initiating a rotation of an engine mounted on a vehicle.

13. A power supply apparatus according to claim 1, wherein said at least one other load is a driving motor for driving a vehicle.

14. A data processor for being powered by a main power supply via a power supply apparatus, wherein the main power supply also providing power to at least one other load, wherein the power supply apparatus including:

a start-up circuit connected to the main power supply and operable to determine when an output voltage of the main power supply is in a stable condition after a fluctuating period of the output voltage during which the at least other load was energized; and a power supply controller connected to the main power supply and operable to initiate the supply of power from the main power supply to the data processor when the output voltage of the main power supply is in the stable condition, the data processor comprising:

a controller having a sleep suspend condition that consumes low power compared to a normal operation condition, wherein the controller communicates data with a memory medium while the data processor is being activated, performs various processes based on a previously stored program, and shifts from the normal operation condition to the sleep suspend condition after storing data used in the various processes to the memory medium when the controller receives a control command.

15. A data processor according to claim 14, wherein the control command is one of a signal indicating a stopping of said at least one other load and a signal indicating a movement to the sleep suspend condition outputted by the power supply apparatus.

16. A data processor according to claim 14, wherein the controller returns to a previous condition that is before moving to the sleep suspend condition, when the controller receives a restore signal from the power supply apparatus during the sleep suspend condition.

17. A data processor according to claim 14, wherein the controller returns to a previous condition that is before moving to the sleep suspend condition, when the controller receives an externally inputted restore signal during the sleep suspend condition.

18. A data processor according to claim 14, wherein the controller moves to a stop condition in which operation is shut down, when an output voltage from the power supply apparatus is not within a predetermined range.

19. A data processor according to claim 14, wherein the controller moves to a stop condition in which operation is shut down, when a stop signal is received from the power supply apparatus.

20. A data processor according to claim 14, wherein the controller moves to a stop condition in which operation is shut down, when an abnormal condition, which can be detected by the controller, occurs during performing the various processes based on previously stored program.

21. A data processor according to claim 14, wherein the memory medium stores operating system and an application program, the controller writes first data, which is used by the ongoing application program, into the memory medium while the application program is carried out on the operating system by read from the memory medium, and the controller shifts to the sleep suspend condition after writing the first data.

22. A data processor according to claim 21, wherein the controller reads the first data from the memory medium to carry out the application program when the controller receives a restore signal from the power supply apparatus during the sleep suspend condition.

* * * * *